(12) United States Patent
Loseke (10) Patent No.: US 6,468,146 B1
(45) Date of Patent: *Oct. 22, 2002

(54) CARCASS ALIGNMENT SYSTEM FOR CARCASS SPLITTER

(75) Inventor: Terry O. Loseke, North Platte, NE (US)

(73) Assignee: Jarvis Products Corporation, Middletown, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/859,024

(22) Filed: May 16, 2001

(51) Int. Cl.[7] .................................................. A22B 5/20
(52) U.S. Cl. ...................................................... 452/160
(58) Field of Search ................................ 452/149, 153, 452/160

(56) References Cited

U.S. PATENT DOCUMENTS

| 3,916,482 A | 11/1975 | Kvilhaug |
| 4,507,822 A | 4/1985 | Herubel |
| 4,562,614 A | 1/1986 | Gerding |
| 4,653,150 A | 3/1987 | Leining |
| 5,112,272 A | 5/1992 | Andersen |
| 5,421,772 A | * 6/1995 | Durand ........................ 452/160 |
| 5,542,878 A | 8/1996 | Sheedy et al. |
| 5,613,905 A | 3/1997 | Van Ochten et al. |
| 5,655,960 A | 8/1997 | Van Horeebeck |
| 6,126,536 A | 10/2000 | Kielwasser |

* cited by examiner

Primary Examiner—Charles T. Jordan
Assistant Examiner—Judith A. Nelson
(74) Attorney, Agent, or Firm—DeLio & Peterson, LLC (57) ABSTRACT

A carcass alignment system for holding and positioning a carcass for splitting by an automated saw while the carcass is suspended and continuously moving along a carcass rail includes back rollers for contacting the back and upper sides of the carcass, guide rollers for contacting the backbone on the inner side of the carcass and guide sleds that slide along the sides of the backbone and preposition the backbone for the guide rollers. Two back rollers are specially shaped to match the expected shape of the carcass and provide primary positioning for the back of the carcass. Two other back rollers provide additional support for the back of the carcass and also contact the upper sides of the carcass.

20 Claims, 5 Drawing Sheets

CARCASS ALIGNMENT SYSTEM FOR CARCASS SPLITTER

BACKGROUND OF THE INVENTION

1. Field of the Invention

The present invention relates to carcass alignment systems for holding and positioning a carcass for splitting by an automated saw while the carcass is suspended and continuously moving along a carcass rail.

2. Description of Related Art

One step in the processing of carcasses, particularly hog carcasses, is to split the carcass after it has been eviscerated. Automated saws for accomplishing this task are known, but they often cut inaccurately, which wastes valuable meat and makes subsequent processing more difficult. The difficulty generally lies in accurately positioning carcasses of varying sizes and shapes while the automated saw moves in a known cutting path.

One type of carcass alignment system for holding the carcass during cutting is shown in U.S. Pat. No. 4,653,150 issued to Leining Mar. 31, 1987. The carcass is held between a pair of guide plates that extend out from a frame as the saw is extended out from an opposite side of the frame. The guide plates in this design do not accommodate variations in the size and shape of the carcass. This causes the saw to wander from one side of the backbone to the other. This inaccurate cutting relative to the backbone is highly objectionable to the meat processing industry.

More modern carcass alignment systems use rollers that track the inside and outside of the carcass and continuously reposition the portion of the carcass nearest to the saw as the cutting saw moves. Such designs are seen in U.S. Pat. No. 6,126,536 issued to Kielwasser on Oct. 3, 2000 and in U.S. Pat. No. 5,655,960 issued to Van Horeebeck on Aug. 12, 1997. These designs use pairs of smooth conical or cylindrical rollers, with wider rollers at the back of the carcass than on the inner side. While these designs provide improved accuracy over earlier designs, it has been found that inaccurate cutting still occurs.

A particular problem has been rotating the carcass so that the centerline along the back of the carcass is in the cutting plane. Previously, the back rollers have been either conical or cylindrical and relatively smooth. Such rollers primarily contact the back of the carcass, not the sides and do not conform well to the shape of the back of the carcass. The carcass has been able to slip relative to these rollers and they have not been able to exert a sufficient alignment force to bring the carcass into the desired position. A small misalignment at the back of the carcass, even where the inside is correctly aligned results in a significant cutting error.

Another problem has been aligning the inside of the carcass at the backbone with the saw. Previously pairs of relatively thin rollers with angled roller surfaces have been used to bring the backbone along the inside of the carcass into the desired position. Although this is effective for accurately bringing the backbone to the correct position, it has been found that occasionally the relatively narrow angled surfaces on these narrow rollers will fail to bring the backbone to the correct location Bearing in mind the problems and deficiencies of the prior art, it is therefore an object of the present invention to provide a carcass alignment system that improves the positioning of both the back and the inner side of the carcass relative to an automated saw as the saw cuts the carcass.

Still other objects and advantages of the invention will in part be obvious and will in part be apparent from the specification.

SUMMARY OF THE INVENTION

The above and other objects, which will be apparent to those skilled in art, are achieved in the present invention which is directed in a first aspect to a carcass alignment system for positioning a suspended carcass during cutting by an automated saw. The carcass alignment system includes a plurality of back rollers, the back rollers including a back contact section adapted to contact a back of the carcass and a side contact section adapted to contact a side of the carcass; and at least two guide rollers or two guide sleds.

The guide rollers or guide sleds contact opposite sides of a backbone of the carcass and are mounted to move on opposite sides of the carcass from the back rollers to hold the carcass there between as the automated saw cuts the carcass. In the preferred design, both guide rollers and guide sleds are provided and the guide wheels are mounted to the guide sleds. The guide sleds are pivotally mounted to bring the guide wheels into contact with the carcass after the guide sleds have made contact.

Both the guide sleds and the guide wheels are provided with opposed angled surfaces that trap the backbone between them. The guide sleds are preferably wider than the guide rollers and have a linear contact section that greatly increases the contact area with the carcass.

The back rollers are specially shaped to match the expected shape of carcasses to be split. The back contact section is preferably curved. The side contact sections are preferably straight. In the most highly preferred embodiment, there are four back rollers that cooperate to guide the carcass back into the desired position. Two of the four back rollers have curved back contact sections and two have straight back contact sections, while all four back rollers have side contact sections that are substantially straight and extend at a 15 degree angle to the vertical.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENTS

In describing the preferred embodiment of the present invention, reference will be made herein to FIGS. 1–5 of the drawings in which like numbers refer to like features of the invention.

Figure 1:
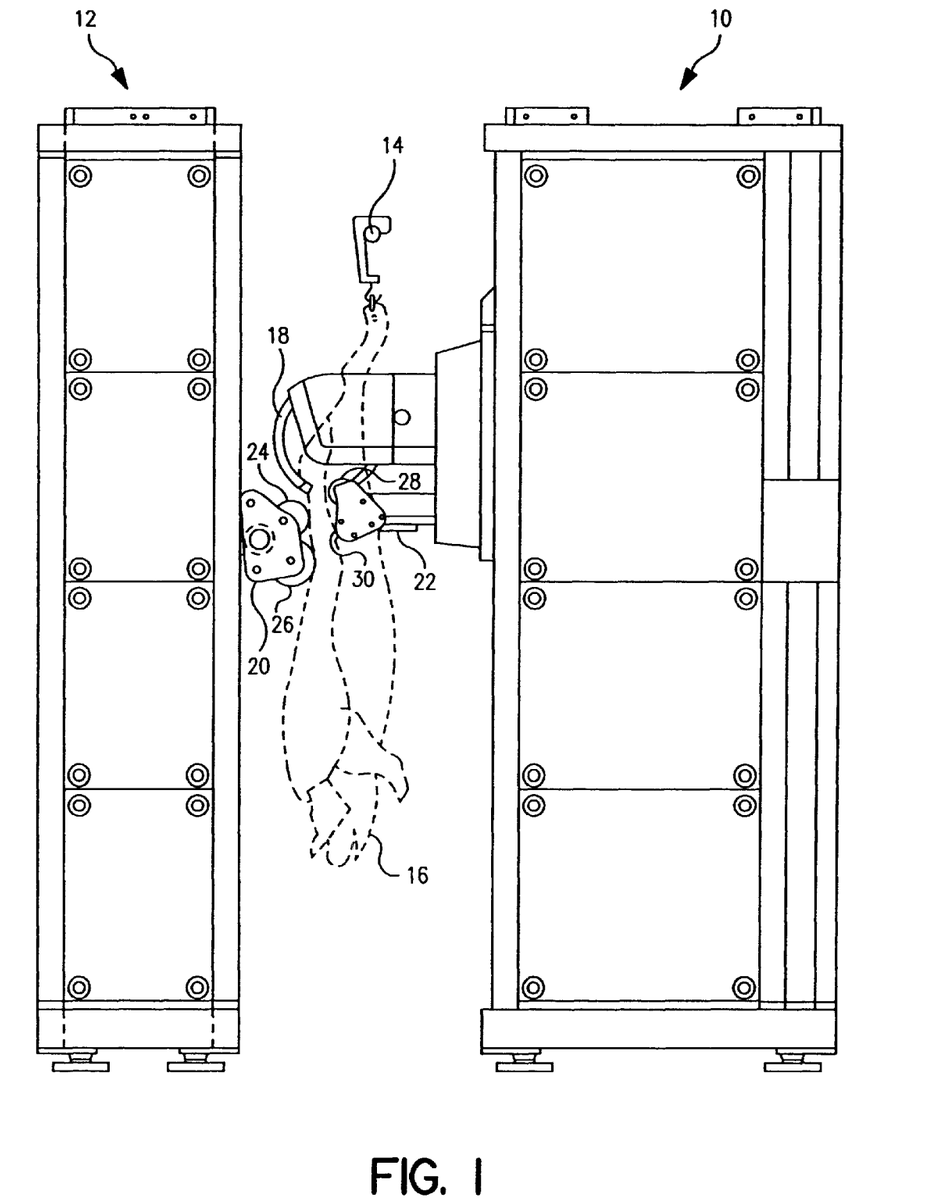
FIG. 1 is a side elevational view of an automated saw incorporating a carcass alignment system constructed according to the present invention installed in an automated saw of the type shown in U.S. Pat. No. 6,126,536.

FIG. 1 shows an automated carcass splitting saw of the type seen in U.S. Pat. No. 6,126,536 having a carcass alignment system according to the present invention installed to position and align the carcass during cutting. The automated saw includes a splitting station 10 and a back roller station 12 located on opposite sides of a carcass rail 14. Carcasses 16 are suspended by their hind feet from trolleys carried on the carcass rail 14, and the carcasses are continuously driven between the splitting station 10 and back roller station 12 where they are split by saw 18. The saw moves vertically down to make the splitting cut and simultaneously moves horizontally to track the motion of the carcass along the carcass rail. Details of the operation of this type of saw are found in U.S. Pat. No. 6,126,536, which is incorporated herein by reference.

Although the present invention is described in connection with its use in a saw of the type seen in U.S. Pat. No. 6,126,536, the invention may also be installed in other automated carcass splitting saw designs, provided that the saw is intended for use with a suspended carcass. All such automated saws include a carcass alignment system intended to bring the suspended carcass into a known position while the automated saw makes the cut.

The carcass alignment system of this invention is directed to the particular shapes and combinations of the rollers and guides that contact the back, sides and backbone of the carcass, as well as the relative positions of the rollers and guides. It has been found through extensive experimentation and long experience with earlier designs that the alignment system is critical to obtaining an accurate cut that is acceptable to the meat processing industry. The shapes and the positions of the components of the carcass alignment system that actually contact the carcass are the key to achieving the desired alignment between the carcass and the saw.

In the embodiment of the invention seen in FIG. 1, the carcass 16 is held between a back roller carriage 20 and a guide roller carriage 22. The back roller carriage includes a pair 24 of upper back rollers 24a, 24b and a pair 26 of lower back rollers 26a, 26b (see FIGS. 2 and 3). The guide roller carriage includes a pair 28 of guide rollers 28a, 28b and a pair 30 of guide sleds 30a, 30b (see FIGS. 4 and 5) that make sliding contact with the carcass.

The back rollers are extended into contact with the back of the carcass first. This stops any swinging motion of the suspended carcass. The back rollers act against the back and sides of the carcass to rotate the carcass and bring the centerline of the back into the plane of the saw 18. Next, the guide rollers and guide sleds are extended into contact with the inner side of the carcass. The guide rollers and guide sleds act against the backbone from the inside to provide final alignment relative to the saw. As the saw moves vertically down to make the cut, the rollers and guide sleds of the alignment system reposition the hanging carcass just ahead of the saw just before the cut is made.

Figure 2:
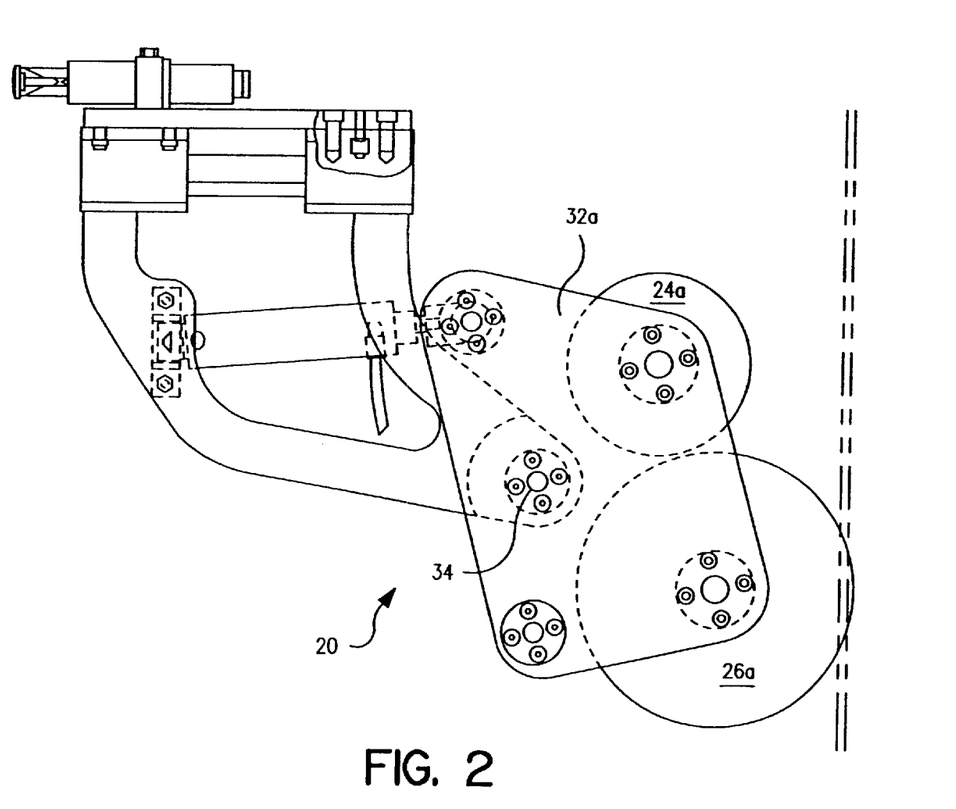
FIG. 2 is a detailed side elevational view of the back roller carriage used in the automated saw seen in FIG. 1.

As may be seen in FIG. 2, the back rollers are mounted on a pivoting bracket 32 composed of two parallel bracket plates 32a, 32b that pivot on pivot 34 to follow the curvature of the carcass (as illustrated in FIG. 1). The bracket is biased to return to the position Illustrated in FIG. 2 when not in contact with the carcass.

Figure 3:
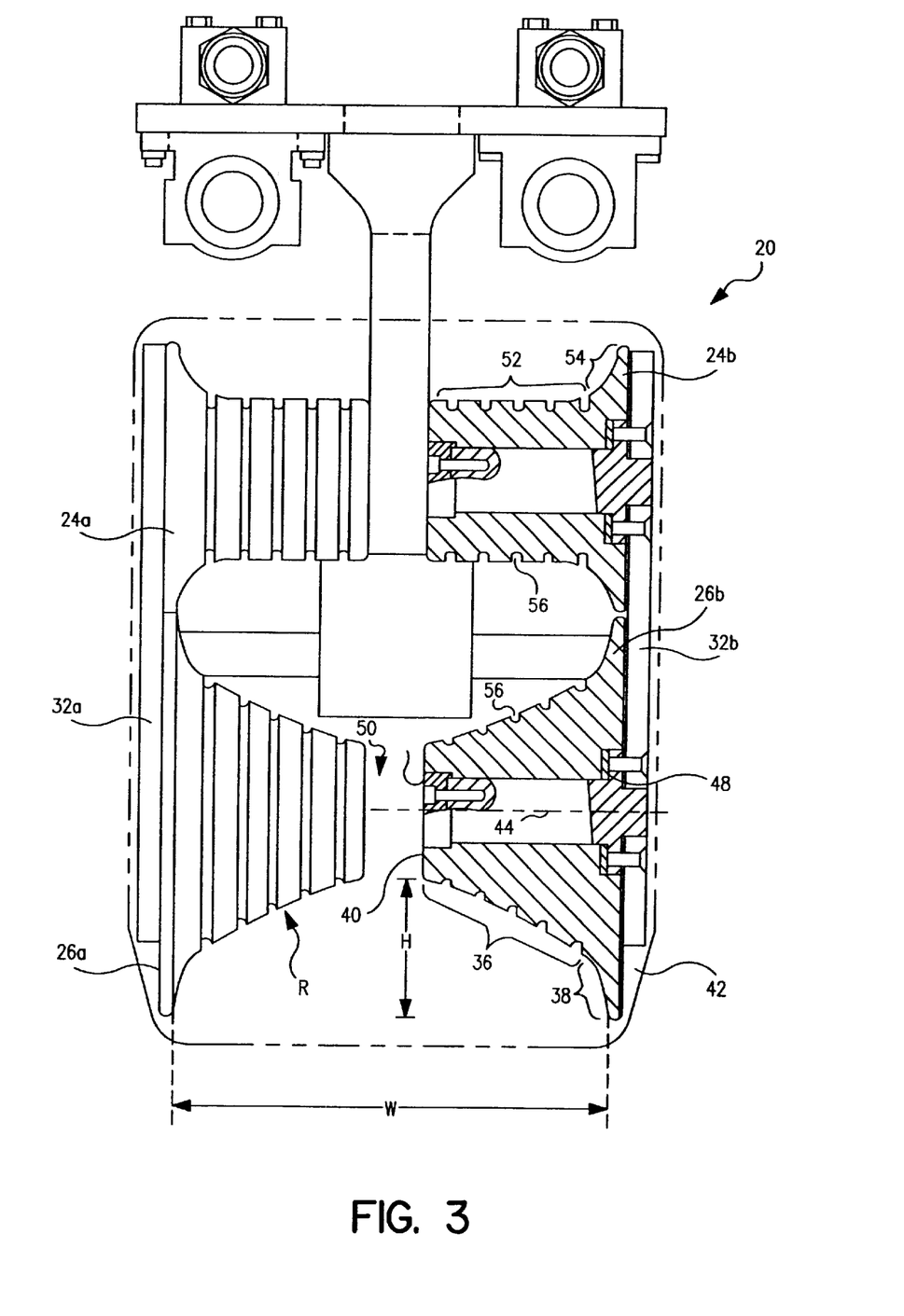
FIG. 3 is a detailed front elevational view of the back roller carriage seen in FIG. 2. The rollers on the right side are shown in cross-section.

The left side of FIG. 3 provides a front elevational view of back rollers 24a and 26a while the right side provides cross-sections of identical back rollers 24b and 26b. The cross sections are taken through the rotational axis of the rollers, and this cross-section defines the cross-sectional perimeter of each roller.

The cross-sectional perimeter of roller 26b includes a back contact section 36, a side contact section 38, an inner face section 40 and an outer face section 42. The rollers are all rotationally symmetrical about their own axis of rotation. Accordingly, the portion of the cross-sectional perimeter of roller 26b opposite the rotational axis 44 of roller 26b is identical in shape to the back contact section 36 and the side contact section 38.

The inner face section 40 includes a bearing 46 and the outer face section 42 includes a bearing 48 allowing the back roller to spin freely about axis 44. The outer face section 42 is parallel to and mounted closely adjacent to bracket plate 32b.

The back and side contact sections 36, 38 are shaped to approximately match the expected shape of the back and upper sides of carcasses to be split. The back contact section contacts the back of the carcass and the side contact section contacts the upper side of the carcass to firmly grasp each carcass and reposition it as the back rollers turn. As can be seen in FIG. 3, the back and side contact sections of rollers 26a and 26b cooperate to form a curve having a width W and a height H. This curve is selected to approximately match the shape of carcasses to be split.

In the preferred embodiment shown in FIG. 3, the back contact section 36 forming part of the cross-sectional perimeter is a circle segment, the circle having a radius of curvature R of 12 inches (30 cm). The side contact section 38 is straight and extends at an angle of 15 degrees to the vertical plane. The opposing rollers 26a and 26b are mounted such that the distance between their opposing side contact sections is approximately 12 inches (30 cm). These dimensions are suitable for processing hogs at the size and weight normally found in a U.S. hog processing operation.

The transition from the curved back contact section to the straight side contact section has a radius of curvature of approximately one inch (2.5 cm). The transitions from the contact sections to the vertical faces 40, 42 have radii between 0.15 and 0.3 inches (4–8 mm) although these numbers may be varied.

By approximately matching the expected shape of the back of a carcass, the contact sections on the two rollers 26a and 26b move the carcass into the desired position for cutting the carcass. The large diameter portions of the roller formed by the side contact section 38 are particularly effective in stopping the carcass from swinging and bringing the center plane of the carcass into parallel alignment with the plane of the saw and preventing the carcass from moving to the sides during Although it is preferred that the back contact section 36 be curved in a circular or elliptical segment, it may also be formed from one or more line segments to approximate the shape of the carcass back. When a circular segment is used, it is preferred that the radius of curvature in the back contact section be greater than six inches and less than 30 inches. The side contact section 38 need not be curved, however, it should be at an angle relative to portions of the back contact section such that the two opposing side contact sections on rollers 26a and 26b capture at least the upper sides of the carcass between them when the back contact section is in contact with the back of the carcass.

In the preferred design shown, the curved back contact section 36 has an angle of about 105 degrees to the vertical in the vicinity of the gap 50, increasing to an angle of about 120 degrees to the vertical near the side contact section 38. The side contact section 38 has an angle of about 15 degrees to the vertical, so the angle between the back contact section 36 and the side contact section 38 varies from about 120 to 135 degrees in the preferred design, but may vary from 90 to less than 180 degrees in other implementations of this invention. Angles from 100 to 145 degrees are preferred. Although a slight outward angle of 15 degrees to the vertical plane has been found to be effective for the side contact sections, other angles from 0 to 45 degrees may also be nay also be used.

The exact angles and curves used should be chosen to approximately match the expected shape of the back of the carcasses to be processed. The side contact sections should have sufficient spacing to accept the carcass and sufficient size to hold the carcass and move it into the desired position through contact with the upper sides of the carcass near the back.

The back rollers 26a and 26b are separated by gap 50, which allows the saw blade 18 to pass between the rollers during cutting. The size of this gap and the axial lengths of the rollers may be adjusted, depending on the particular size, age or type of carcass being processed, to obtain the desired spacing between the side contact sections and the desired shape for the rollers to approximate the shape of the carcass.

The back contact section 52 of the upper back rollers 24a, 24b is straight providing a cylindrical roller shape in this region. However, like the lower back contact rollers, these rollers are also provided with side contact section 54 to help capture the sides of the animal and bring it into position. The side contact section 54 of rollers 24a and 24b, like the side contact section 38 of rollers 26a and 26b is at a 15 degree angle to the vertical plane. The transition between back contact section 52 and side contact section 54 has a radius of 1.5 inches (3.8 cm). The spacing between the upper back rollers is substantially the same as the spacing between the lower back rollers.

Although four rollers have been found to be effective, additional rollers, or fewer rollers may be combined to match the shape of the back and upper sides of the carcass according to this invention. Specifically, the back contact sections and the side contact sections may be formed on different rollers, and the axes of such rollers may be angled or parallel to each other to make the roller surfaces approximate the shape of the carcass.

In the design illustrated, both the upper and lower back rollers are provided with grooves 56 having a depth and width of approximately 0.25 inches (0.6 cm). The size of the grooves is not critical. The grooves serve to increase the friction between the rollers and the carcass.

The large outer portions of the side contact sections 38, 54 on the back rollers act to stop the swinging of the carcass and rotate it, as needed, into approximate alignment with the plane of the saw. However, it is the guide carriage 22 seen in FIGS. 4 and 5 that provides the most accurate control over the carcass after the back rollers have brought it nearly into the desired position. The inner side of the carcass is contacted first by the pivoting guide sleds 30a, 30b composed of outer guide sled plates 60a and 60b and inner guide sled pieces 62a and 62b (see FIG. 5). The guide sleds pivot on pivot 76 and a pivoted position is shown in phantom in FIG. 4. The guide sleds are biased to the position seen in solid lines in FIG. 4 and return to that position when the sleds are not in contact with the carcass.

Figure 4:
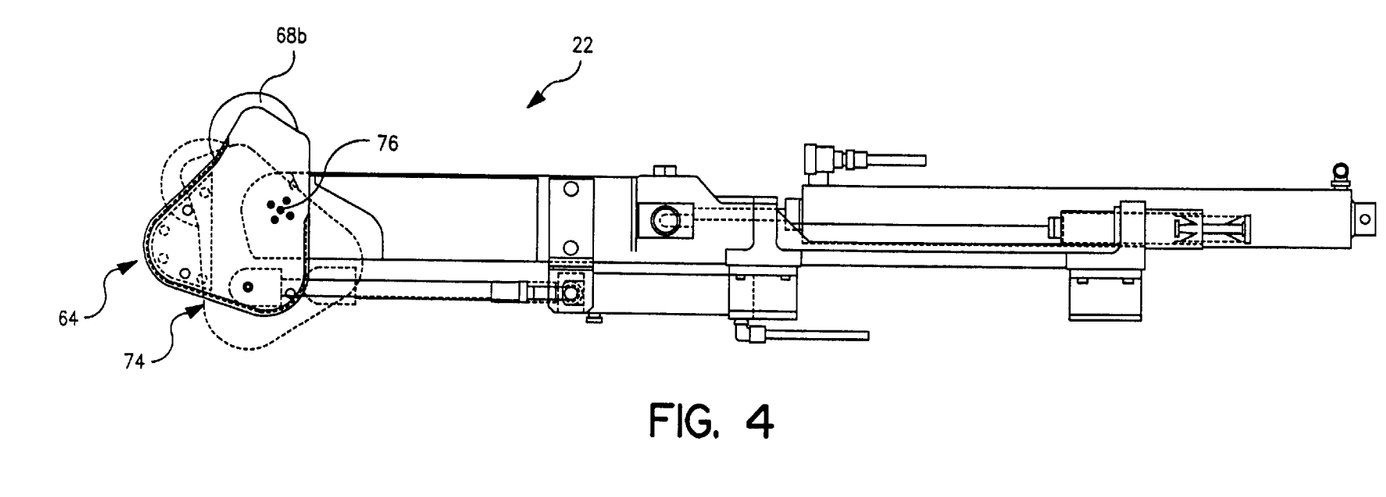
FIG. 4 is a detailed side elevational view of the guide roller carriage used in the automated saw seen in FIG. 1. A pivoted location for the guide sleds is shown in phantom.
Figure 5:
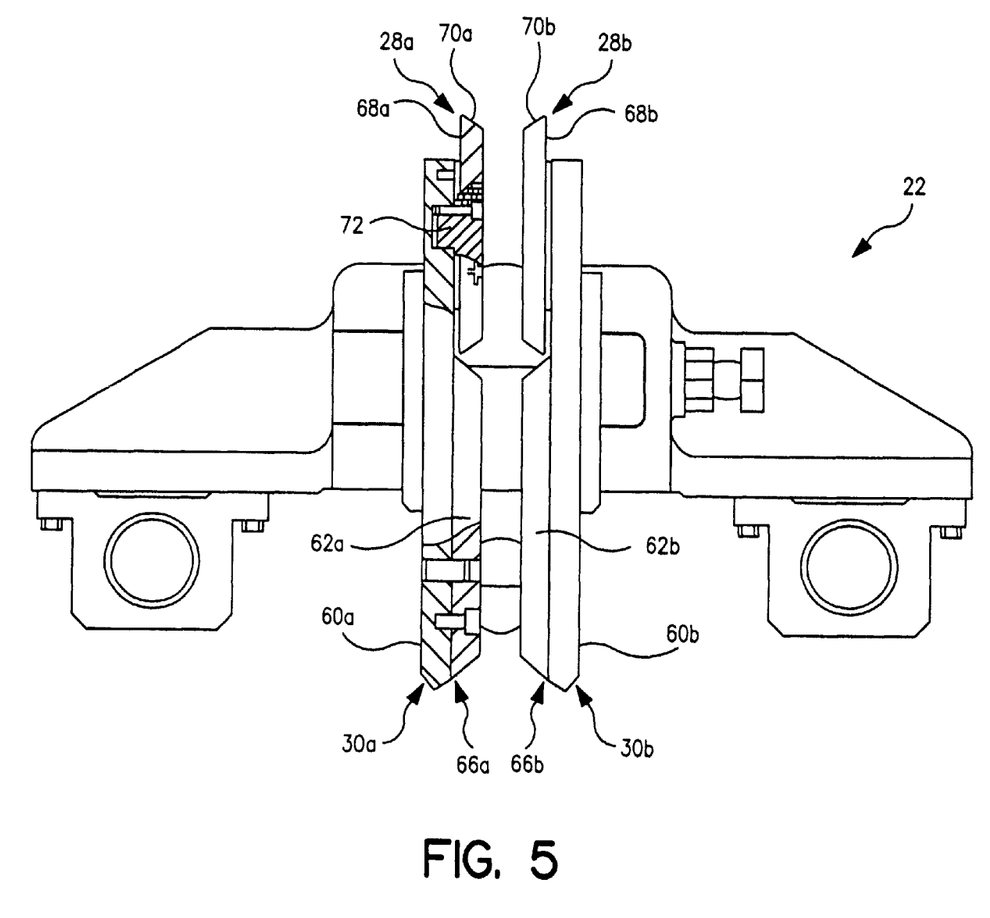
FIG. 5 is a detailed front elevational view of the guide roller carriage seen in FIG. 4. The roller and sled on the left side are partially shown in cross-section.

The guide sleds include a rounded contact section 64 and inwardly angled surfaces 66a and 66b that extend around the perimeter of the guide sleds. After the back roller carriage is extended to bring the back rollers into contact with the carcass, the guide roller carriage is extended and the guide sled contacts the carcass backbone. The inwardly angled surfaces 66a, 66b contact opposite sides of the backbone and draw the backbone exactly into the desired position between them.

As the guide roller carriage is further extended, the guide sleds rotate on pivot 76 as illustrated in phantom in FIG. 4, bringing the guide rollers 68a and 68b into contact with the carcass on either side of the backbone. The guide rollers are provided with corresponding inwardly angled surfaces 70a and 70b and are mounted to spin freely on separate bearings, one of which is shown at 72 in the cross-section of guide roller 68a.

The rounded contact section 64 of the guide sleds has approximately the same radius of curvature as the guide rollers 68a and 68b and the same angle for the angled surfaces 66a, 66b as is found on angled surfaces 70a, 70b of the guide rollers. However, the width of the angled surfaces 66a, 66b on the guide sleds (composed of guide sled plates 60a, 60b and guide sled pieces 62a, 62b) is much greater than the width of the angled surfaces 70a, 70b on the guide rollers. This ensures that the backbone will be captured and moved nearly into the desired final position. The narrower guide rollers can then make the final repositioning without risk that the backbone will escape from between the rollers as could occur with earlier designs using narrow rollers only.

Another advantage of the sled design over earlier designs is the significant increase in contact area between the sleds and the carcass as compared to the contact area between a roller and the carcass. The rotation of the sleds into the phantom position in FIG. 4 causes the linear contact sections 74 of the sleds located between the rounded contact section 64 of the guide sleds and the guide rollers 68a, 68b to come into contact with the carcass on opposite lateral sides of the backbone. This provides an extended wide and long contact region that improves the guiding of any backbone having irregularities, bumps and protrusions along its length that might result in misguiding by rollers having a small circumferential contact area. The continuous sliding action of the guide sleds along the length of the backbone ensures that the backbone will also slide easily in the transverse direction down the angled surfaces 66a, 66b and into the gap between the opposing angled surfaces before the rollers 68a, 68b.

It is preferred that the guide roller carriage and the back roller carriage be fully extended before the saw is extended and the saw begins to cut. This accurately positions the carcass before any cutting begins. After the saw 18 is extended, the guide sleds, guide rollers and back rollers all move down the carcass with the saw. The guide sleds pull the backbone closely into the desired position and prevents motion side to side. The guide rollers then make the final back bone alignment, just before the saw makes the splitting cut.

It is preferred that the back rollers of this invention be used in combination with the guide sleds and the guide rollers of this invention. However, the back rollers principally address the problem of improving the positioning of the back, while the guide rollers and guide sleds improve the positioning of the backbone at the inside of the carcass. Thus, the improvements of the invention are independent and may be used separately or in various combinations to improve the operation of existing automated saw designs.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A carcass alignment system for positioning a suspended carcass during cutting by an automated saw, the carcass alignment system comprising:
   a plurality of back rollers, the back rollers including a back contact section adapted to contact a back of the carcass and a side contact section adapted to contact a side of the carcass; and
   at least two guide rollers, the guide rollers contacting opposite sides of a backbone of the carcass;
   the back rollers and the guide rollers being mounted to move on opposite sides of the carcass to hold the carcass between the back rollers and the guide rollers as the automated saw cuts the carcass.

2. The carcass alignment system of claim 1 further including at least two opposed guide sleds, the guide sleds making sliding contact on opposite sides of a backbone of the carcass as the automated saw cuts the carcass.

3. The carcass alignment system of claim 2 wherein the guide sleds are pivotally mounted to follow the backbone of the carcass as the automated saw cuts the carcass.

4. The carcass alignment system of claim 3 wherein the guide sleds contact the carcass before the guide wheels and the guide sleds pivot to bring the guide wheels into contact with the carcass.

5. The carcass alignment system of claim 2 wherein the guide wheels are mounted to the guide sleds.

6. The carcass alignment system of claim 2 wherein the guide sleds include opposed angled surfaces.

7. The carcass alignment system of claim 2 wherein the guide sleds have a width greater than a width of the guide wheels.

8. The carcass alignment system of claim 2 wherein the guide sleds have a rounded contact section and a linear contact section, the rounded contact section making contact with the carcass prior to the linear contact section.

9. The carcass alignment system of claim 1 wherein the back contact sections are curved.

10. The carcass alignment system of claim 1 wherein the side contact sections form an angle from 0 to 45 degrees relative to the vertical.

11. The carcass alignment system of claim 1 wherein the side contact sections form an angle of approximately 15 degrees relative to the vertical.

12. The carcass alignment system of claim 1 wherein the back contact sections form an angle relative to the side contact sections of greater than 90 degrees and less than 180 degrees.

13. The carcass alignment system of claim 1 wherein the back contact sections are curved and form an angle relative to the side contact sections of between 100 and 145 degrees.

14. The carcass alignment system of claim 1 wherein the back rollers have grooves formed therein.

15. The carcass alignment system of claim 1 wherein the back rollers include a first pair of back rollers having curved back contact sections and second pair of back rollers having substantially straight back contact sections.

16. The carcass alignment system of claim 15 wherein the first and second pair of back rollers have substantially straight back side contact sections.

17. A carcass alignment system for positioning a suspended carcass during cutting by an automated saw, the carcass alignment system comprising:
   a plurality of back rollers, the back rollers including a back contact section adapted to contact a back of the carcass and a side contact section adapted to contact a side of the carcass; and
   at least two opposed guide sleds, the guide sleds making sliding contact on opposite sides of a backbone of the carcass;
   the back rollers and the guide rollers being mounted to move on opposite sides of the carcass to hold the carcass between the back rollers and the guide sleds as the automated saw cuts the carcass.

18. The carcass alignment system of claim 17 further including at least two opposed guide rollers mounted on the guide sleds.

19. The carcass alignment system of claim 18 wherein the guide sleds are pivotally mounted to follow the backbone of the carcass as the automated saw cuts the carcass.

20. The carcass alignment system of claim 19 wherein the guide sleds include opposed angled surfaces.

* * * * *

UNITED STATES PATENT AND TRADEMARK OFFICE
CERTIFICATE OF CORRECTION

PATENT NO.     : 6,468,146 B1
DATED          : October 22, 2002
INVENTOR(S)    : Terry O. Loseke

It is certified that error appears in the above-identified patent and that said Letters Patent is hereby corrected as shown below:

Column 1,
Line 23, after "Leining" insert -- on --.

Column 5,
Lines 7 and 8, delete "nay also be".

Signed and Sealed this

Eleventh Day of March, 2003

JAMES E. ROGAN
*Director of the United States Patent and Trademark Office*